T. T. PIERCE.
NON-SKID CHAIN FOR AUTOMOBILE TIRES.
APPLICATION FILED JAN. 6, 1920.
1,357,897.
Patented Nov. 2, 1920.
2 SHEETS—SHEET 1.
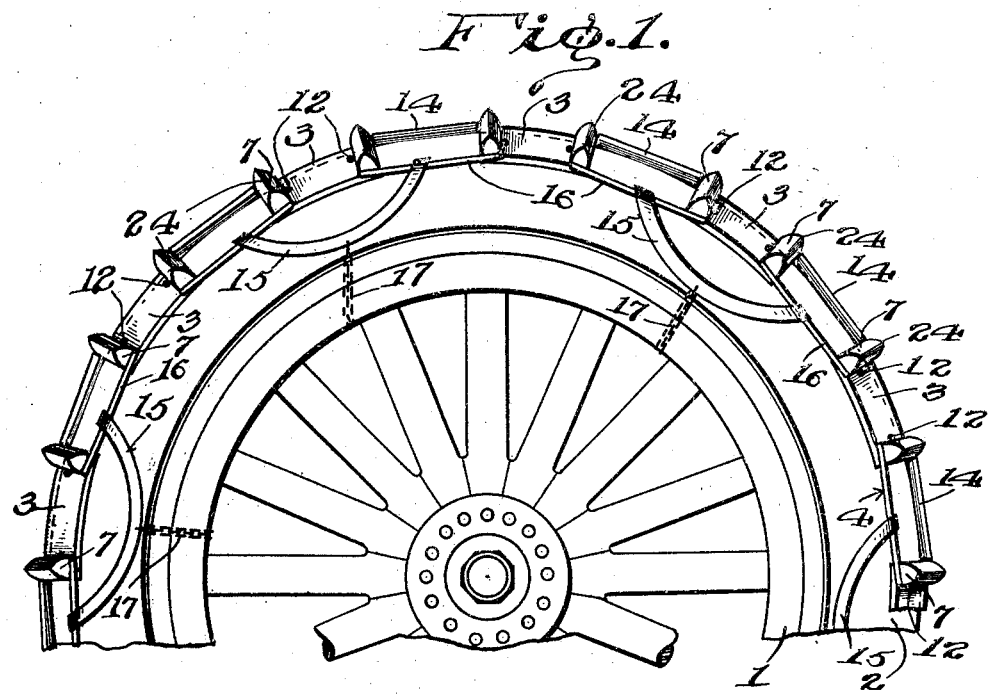
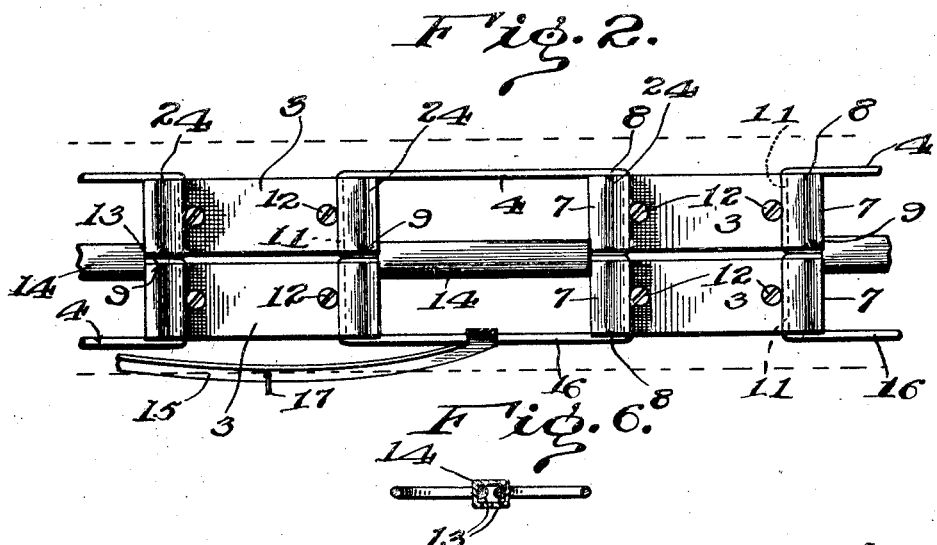

T. T. PIERCE.
NON-SKID CHAIN FOR AUTOMOBILE TIRES.
APPLICATION FILED JAN. 6, 1920.
1,357,897.
Patented Nov. 2, 1920.
2 SHEETS—SHEET 2.
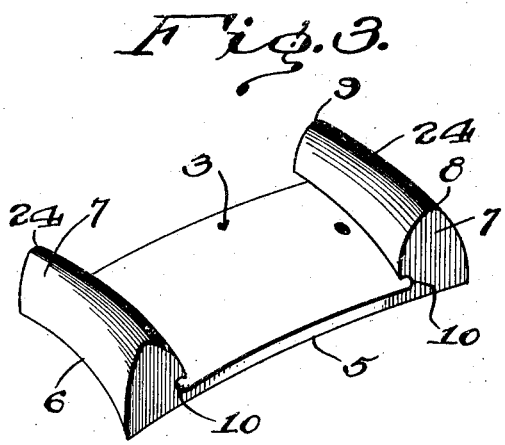
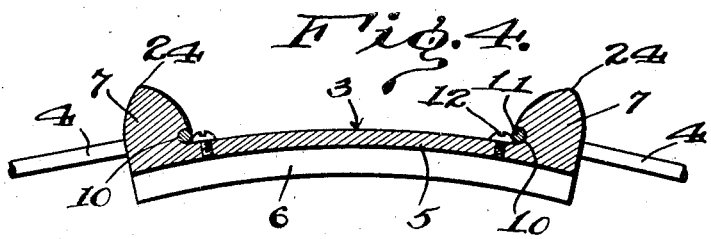
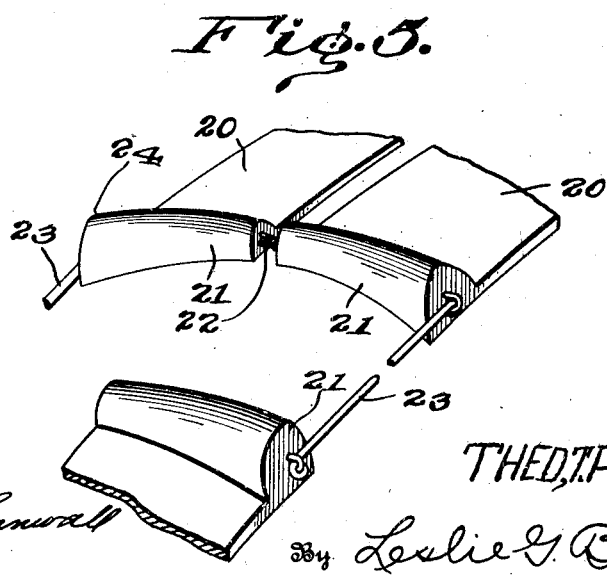
Inventor
THEO. T. PIERCE
Witness
Floyd P. Cornwall
By Leslie G. Bruce
Attorney

UNITED STATES PATENT OFFICE.

THEODORE T. PIERCE, OF BOISE, IDAHO.

NON-SKID CHAIN FOR AUTOMOBILE-TIRES.

1,357,897.   Specification of Letters Patent.   Patented Nov. 2, 1920.

Application filed January 6, 1920. Serial No. 349,736.

*To all whom it may concern:*

Be it known that I, THEODORE T. PIERCE, a citizen of the United States, residing at Boise, in the county of Ada and State of Idaho, have invented certain new and useful Improvements in Non-Skid Chains for Automobile-Tires, of which the following is a specification.

This invention relates to improvements in external armors or non-skid chains for automobile tires and the invention is particularly directed to improvements in the road engaging shoes.

One of the objects of the invention is to provide an improved chain which will snugly engage the periphery of the tire both circumferentially and transversely.

Another object of the invention is to provide improved road engaging shoes, all of which consist of similar castings.

A still further object is to provide an improved chain which may be folded into a small bundle for storage purposes. Another object is to furnish a chain including a number of detachable and exchangeable parts, so that a part or parts may be replaced without discarding the entire chain.

With the foregoing objects outlined and with other objects in view, which will appear as the description proceeds, the invention consists in the novel features hereinafter described in detail, illustrated in the accompanying drawings and more particularly pointed out in the appended claims.

Referring to the drawings:—

Figure 1 is a side view of a portion of a wheel and tire having my improved chain attached thereto.

Fig. 2 is a top plan view of a portion of the chain.

Fig. 3 is a perspective view of one of the improved shoes.

Fig. 4 is a longitudinal sectional view of one of the shoes and showing the manner of attaching the same to the connecting links.

Fig. 5 is a fragmentary perspective view of a modified form of chain.

Fig. 6 is a transverse sectional view of one of the pairs of connecting links used in connection with the chain illustrated in Figs. 1 and 2.

In the drawings, 1 represents a wheel provided with the usual pneumatic or cushion tire 2. Around the periphery of this tire is placed my improved non-skid chain, which consists of alternate pairs of shoes 3 and links 4.

Each of the shoes, as best shown in Figs. 3 and 4, consists of a curved rectangular plate 5 having its under surface curved transversely, as shown at 6 and provided on its outer side with two end projecting lugs 7. One end of each of the lugs 7, as shown at 8, is of greater height than the opposite end 9 of said lug and the smaller or shorter end 9 when the chain is arranged on the tire, is arranged opposite the shorter end of a similar lug in that pair of shoes. Each lug is provided with a transverse, undercut, recess 10 which receives one end 11 of one of the links 4 and a screw 12 engages the shoe and abuts against the end of the link to prevent the link from disengaging said recess. Each pair of links have their adjacent sides 13 tied together by means of an open ended casing 14 and the several casings of the link elements prevent the opposite links and shoes from pulling apart, so that the chain will be prevented from riding transversely on the tire. Strap members 15 are connected to the outer sides 16 of the links and chains 17 pass around the felly of the wheel and prevent the chain from leaving the tire.

In the embodiment of the invention illustrated in Fig. 5, the shoes 20 are similar to the shoes in the remaining figures, but they do not have the undercut recesses. Instead of the recesses and the identical form of links shown in the other figures, the end lugs 21 of the shoes 20 have their shorter ends connected by links 22, (only one of which is shown), and the larger ends of adjacent pairs of shoes are connected together by tie rods 23.

When either of the foregoing constructions is in use, the tapered ends 24 of the shoe lugs will act to engage or bite into the road surface and prevent the wheel from skidding.

While I have illustrated and described the preferred embodiments of the invention, I am aware that various modifications and changes may be made therein without departing from the spirit of the invention, as disclosed by the following claims.

What I claim and desire to secure by Letters Patent is:—

1. A non-skid chain for wheel tires including a series of spaced pairs of shoes, each curved longitudinally and having its under surface curved transversely, lugs integral with each end of a shoe and projecting outwardly, each lug being of greater height at one end than the other, and links connecting said shoes.

2. A non-skid chain including spaced pairs of shoes, each of which is curved longitudinally and has its under surface curved transversely to snugly engage the periphery of a tire, a pair of integral lugs provided at the ends of each shoe and being higher at one end than the other, a pair of links connecting adjacent pairs of shoes, and an open ended casing connecting said pair of links.

3. A non-skid chain including a series of spaced pairs of shoes, each shoe being provided at its opposite ends with outwardly projecting lugs having recessed inner surfaces, links connecting adjacent pairs of said lugs and having their ends resting in said recesses, and means preventing said links from disengaging said recesses.

4. A non-skid chain including spaced pairs of shoes, each shoe being curved longitudinally and having its under surface curved transversely, outwardly extending lugs provided at each end of a shoe and having their inner sides transversely recessed, a pair of links connecting adjacent pairs of shoes and having their ends resting in the recesses of adjacent lugs, and screws engaging said shoes and abutting against said links for preventing disengagement of the links from said recesses.

5. A chain of the kind defined in claim 4 in which the links of a pair of links are connected together by a longitudinally extending open ended casing.

6. A non-skid chain comprising a series of spaced pairs of longitudinally curved shoes having transversely extending end lugs which are of greater height at their outer ends than at their inner ends, the inner face of each lug being provided with a transversely extending under cut recess, pairs of rectangular links connecting adjacent pairs of shoes and having their ends resting in said recesses, detachable means secured to the shoes and extending in front of the recesses for preventing the links from disengaging said recesses, an open ended casing connecting the links of a pair of links, and means for securing certain of said elements to a wheel felly.

In testimony whereof I affix my signature.

THEODORE T. PIERCE.